United States Patent [19]
Banjavich et al.

[11] 3,785,160
[45] *Jan. 15, 1974

[54] METHOD AND APPARATUS FOR WORKING ON SUBMERGED PIPELINE MEANS

[75] Inventors: Mark P. Banjavich; George R. Morrissey, both of New Orleans; Anthony V. Gaudiano, Metairie, all of La.

[73] Assignee: Taylor Diving & Salvage Co., Inc., Plaquenenes Parish, La.

[ * ] Notice: The portion of the term of this patent subsequent to Feb. 15, 1989, has been disclaimed.

[22] Filed: Feb. 1, 1972

[21] Appl. No.: 222,577

Related U.S. Application Data

[63] Continuation-in-part of Ser. No. 841,777, July 15, 1969, Pat. No. 3,641,777.

[52] U.S. Cl. ................................ 61/72.3, 61/69 R
[51] Int. Cl. ...................... B23k 37/04, B63c 11/00
[58] Field of Search ........................ 61/69 R, 72.3; 228/4, 44; 285/24, 27; 166/.5, .6

[56] References Cited
UNITED STATES PATENTS
3,641,777 2/1972 Banjavich et al. ............... 61/72.3 X
3,658,231 4/1972 Gilman............................. 61/69 R X
3,508,410 4/1970 Lynch ................................. 61/69 R

*Primary Examiner*—J. Karl Bell
*Attorney*—James E. Cockfield

[57] ABSTRACT

Method and apparatus for working on submerged pipeline means where multiple forces are exerted on each of a plurality of disconnected pipeline sections to effect alignment of these sections. On at least one section one of the forces functions as a fulcrum or restraining force while another force is operable to effect alignment inducing movement of a free end of the one section.

Method and apparatus for effecting the laying of a pipeline where laying is implemented in conjunction with a transportable, submerged enclosure. The enclosure provides a gaseous environment for pipeline section joinder operations and may be at least partially flooded to facilitate the moving of the enclosure away from an already laid pipeline area.

12 Claims, 17 Drawing Figures

PATENTED JAN 15 1974 3,785,160

METHOD AND APPARATUS FOR WORKING ON SUBMERGED PIPELINE MEANS

RELATED APPLICATIONS

This application is a continuation-in-part of pending U.S. Banjavich et al. application Ser. No. 841,777, filed July 15, 1969, entitled "Method and Apparatus for Working on Submerged Conduit Means" and assigned to the assignee of the present application, now issued as U.S. Pat. No. 3,641,777.

The entire disclosure of the aforesaid Banjavich et al application Ser. No. 841,777 is herein incorporated by reference, insofar as it relates to the disclosure and/or claims of into central present application.

GENERAL BACKGROUND, OBJECTS, AND SUMMARY OF INVENTION

During recent years, intensified activity in relation to the development of offshore oil and gas sources has engendered significant developments in the pipelaying art.

One aspect of offshore operations has entailed the effecting of pipeline repair or joinder operations where an alignment frame is employed to facilitate the alignment of disconnected pipeline section ends and a habitat or enclosure is operated to provide a dry environment within which welding or other pipeline joinder and/or repairing operations may be implemented.

One effort in this connection is exemplified by a Lynch U.S. Pat. No. 3,508,410. The Lynch patent relates to and discloses an integrated alignment frame and habitat where one self-aligning clamp means exerts a restraining or aligning force on one conduit section and another self-aligning clamp means imposes another restraining and/or aligning force on another pipeline section. This unit as disclosed by Lynch does not impart both fulcrum and shifting forces to one or both of two pipeline sections being joined and thus is limited in its utility.

An advance in the art relative to the Lynch concept is exemplified by the concept disclosed in the aforesaid Banjavich et al. application Ser. No. 841,777, filed July 15, 1969. The Banjavich et al. application discloses an improved clamping and aligning concept which repudiates the Lynch concept and in which forces are uniquely exerted on at least one disconnected pipeline section, with one such force being able to function as a fulcrum and another being able to function as a manipulating or shifting force. With this Banjavich et al concept, uniquely effective, composite aligning manipulations of pipeline sections at underwater locations may be effected.

As pipeline laying at offshore locations progresses into deeper and deeper waters, increasing attention is devoted to the possible utilization of techniques which would enable pipeline laying to be effected entirely under water, with the use of conventional surface located, lay barges being eliminated.

Conjecture in relation to such operations is evidenced by U.S. Pats. such as Terrell, No. 3,393,524 which, in a schematic sense, provides a discussion of a propellable underwater pipelaying vehicle. The Terrell disclosure, like others, fails to provide meaningful consideration of the manner in which pipeline sections would be transported to a submerged assembly vehicle and manipulated into joined connection with an already or previously laid pipeline portion.

Various prior patents have suggested, often in a somewhat fanciful way, techniques entailing the use of submerged propellable vessels in connection with pipelaying or cable laying operations. Such patents include Terrell U.S. Pat. No. 3,393,524, Gretter et al. U.S. Pat. No. 3,434,297, McLallen, Jr. U.S. Pat. No. 3,512,367, Poole U.S. Pat. No. 3,514,962 and Brooks et al. U.S. Pat. No. 3,520,358.

Pipelaying operations entail problems substantially different from those involved in cable laying operations.

As to pipelaying operations, the art identified above does not disclose an effective technique which would enable pipe joints to be welded within an underwater enclosure and where the enclosure would define a gaseous environment in communication with a water body and where means would be associated with the enclosure for effecting its propulsion along a pipeline and the feeding of new joints into the interior of the enclosure for joint forming purposes.

Patents such as the Coultrup U.S. Pat. No. 3,407,611 are representative of disclosures of submerged enclosure means which provide a gaseous environment encircling a pipe joint. However, the Coultrup design is devoid of any mechanism for effecting its self-propulsion along a pipeline and is devoid of any means for feeding new joints into the interior of the enclosure.

Significant indications as to how underwater pipeline laying may be implemented with a self-propelled vessel are to be found in the specification of the aforesaid Banjavich et al application Ser. No. 841,777. This present application incorporates the teachings of the Banjavich et al. disclosure and provides specific indications as to how the advantages of the concepts featured in the aforesaid Banjavich et al application may be able to be attained.

With respect to the ultimate aligning and manipulating aspect of this invention, a method is herein presented which entails the manipulating of frame means relative to an underwater pipeline so as to selectively locate the frame means relative to the pipeline for work purposes. From the frame means, a series of longitudinally spaced forces are exerted on at least two disconnected pipeline sections, with these forces being independent in nature and directed transversely of the pipeline sections. On at least one of these two pipeline sections a restraining force is exerted so as to provide fulcrum means reacting transversely on the one pipeline section. Another aligning force is exerted on another portion of this one pipeline section tending to move this other portion generally transversely of the one portion of the pipeline section against which the fulcrum means is reacting. Disconnected ends of the two pipeline sections are isolated in a gaseous environment which is contained relative to the frame means. Within this environment, a joinder of the disconnected and aligned ends of the pipeline sections is effected.

In this connection, it is contemplated that this method aspect of the invention may be most advantageously practiced where such a plurality of forces is operable to be imposed on each of the two pipeline sections to be joined.

In another independently significant method aspect of this invention disconnected ends of pipeline sections to be joined are enclosed within a gaseous environment at an underwater location. A joint interconnecting these disconnected pipeline sections is formed in this gaseous environment. Thereafter, gas is displaced from the environment and the joint interconnecting the pipeline sections is submerged in water. An enclosure which had previously defined the gaseous environment is then transported away from the immersed joint toward an extremity of one of the pipeline sections which is to be joined to another pipeline section. Water is then displaced from the enclosure means and another pipeline joint formed within the newly produced gaseous environment.

Still another significant mehthod aspect of this invention pertains to a composite concept where an enclosure means is provided at a submerged location, which enclosure means includes first, second and third chamber means. In this arrangement the second chamber means is interposed longitudinally between the first and third chamber means relative to a longitudinal axis of the enclosure means. A first pipeline section is supported so that it extends through first chamber means into the second chamber means. A second pipeline section is supported so that it extends from the third chamber means into the second chamber means.

A first seal means is provided between the first and second chamber means and is operable to telescopingly receive the first pipeline section. A second seal means is provided between the second and third chamber means and is operable to telescopingly receive the second pipeline section.

A first aligning clamp means is operable in the second chamber means to engage and selectively manipulate the first pipeline section. A second aligning clamp means is provided in the second chamber means which is operable to engage and selectively manipulate the second pipeline section.

A feeding means is associated with the third chamber means and is operable to selectively advance the second pipeline section from the third chamber means toward and into the second chamber means.

A propulsion means is carried by the enclosure means and is operable to advance the enclosure means from the first pipeline section toward the second pipeline section.

The environment is controlled in the enclosure means by selectively displacing water from the second chamber means to define a gaseous environment encircling disconnected ends of the first and second pipeline sections. After these ends have been joined, gas is transferred from the second chamber means to the first and third chamber means to submerge the first and second seal means. This submergence enables the propulsion means to be operated so as to advance the enclosure means along the pipeline without losing the gaseous environment.

Yet another independent aspect of the invention pertains to a method of laying submerged pipeline with a self-propellable enclosure means. The enclosure means is operable to define a gaseous environment encircling a pipe joint to be made, with this environment being in communicating relation with a water body surrounding the enclosure. After a joint has been made and the enclosure has propelled itself to a new joint location, a new joint is fed into the enclosure for an alignment and joinder operation.

The invention also contemplates various uniquely interacting combinations of apparatus means which enable the aforesaid method aspects of the invention to be effectively implemented.

DRAWINGS

In describing the invention by way of example, but not by way of limitation with respect to the scope of the invention, reference will be made to certain appended drawings.

Various presently preferred embodiments are shown in these appended drawings wherein: method FIG. 1 provides a side elevational view of an installation wherein a diving frame is being manipulated between a surface vessel and submerged pipeline sections;

FIGS. 12A–12F provide a series of schematic, partially sectioned side elevation views of the FIG. 11 apparatus illustrating various steps involved in a representative pipelaying operation wherein:

DETAILED DESCRIPTION OF PREFERRED EMBODIMENTS

In describing the invention, reference will be made to various aspects of aligning and working concepts described in connection with FIGS. 1 through 12.

In connection with the aligning concept, the disclosure of Banjavich et al application Ser. No. 841,777 is herein incorporated by reference insofar as it relates to structure and/or mode of operation of diving frame means featured in FIGS. 1 through 10.

The ensuing discussion of the invention will also pertain to a self-propelled, underwater pipelaying vehicle described in connection with FIGS. 11 and 12A through 12F.

With respect to the underwater pipelaying vehicle, those portions of the specification of the Banjavich et al application Ser. No. 841,777 which pertain to the use of a self-propelled underwater frame and/or habitat are herein incorporated by reference.

Pipeline Aligning Frame and Habitat — Fulcrum and Alignment Aspects

The aforesaid Banjavich et al. application Ser. No. 841,777 describes, in detail, certain forms of structure, certain modes of operation, and representative control circuitry which may be employed to effect the alignment of pipeline sections for repair and/or work and/or joinder purposes.

By way of recapitulation, and with reference to FIGS. 1 through 4 of this application, it will be recalled with reference to the Banjavich et al. disclosure that this aspect of the invention involves the use of a diving frame 1, a diving frame manipulating or transporting means 2, and a habitat 3.

Figure 1:
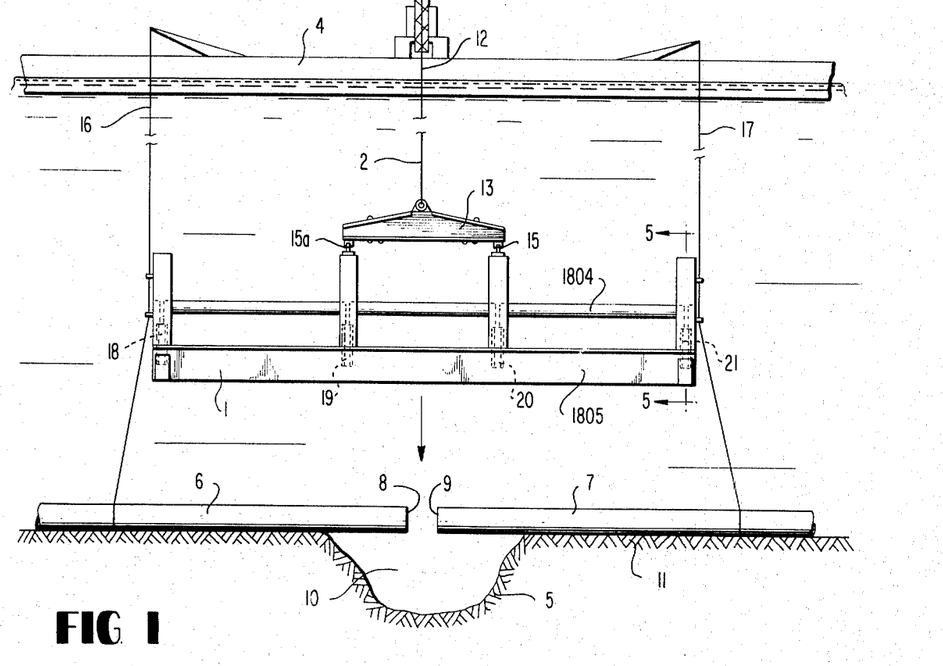

As shown in FIG. 1, a surface located, floating service boat 4 is positioned generally above a submerged location 5. At this submerged location, first and second pipeline sections 6 and 7 are disposed with their free ends 8 and 9 in reasonably close proximity. To facilitate operations, pipeline sections 8 and 9 may be located above a cavity 10 which is formed by jetting or other techniques in a submerged surface 11 supporting these sections. Conventional, diver manipulated, jetting tools may be employed in order to form the cavity 10.

The manipulating means 2 may comprise conventional hoisting and lowering mechanism or means 12 extending from the service boat 4 to hoisting and lowering bar means 13. Bar means 13 may be detachably connected with diving frame 1 via detachably connected joints 15a and 15. The lowering of the diving frame 1 into superposed relation with conduit sections 6 and 7 may be facilitated by guidelines 16 and 17 in the manner generally described in the aforesaid Banjavich et al application.

As is described in the Banjavich et al. application, the hoisting or manipulating means 2 is operated so as to lower the diving frame 1 toward the pipeline sections 6 and 7. During this lowering operation, or at least at the end of the lowering operation, a plurality of articulated clamps 18, 19, 20 and 21 carried by frame 1 will be disposed in an open position so that the downwardly facing open ends of the clamps will receive the pipeline sections.

Thus, with the arrangement shown in FIG. 1, frame 1 will be lowered so that clamp means 18 and 19 will be disposed in engagement with pipeline section 6, while clamps 20 and 21 will be disposed in engagement with pipeline section 7.

Figure 2:
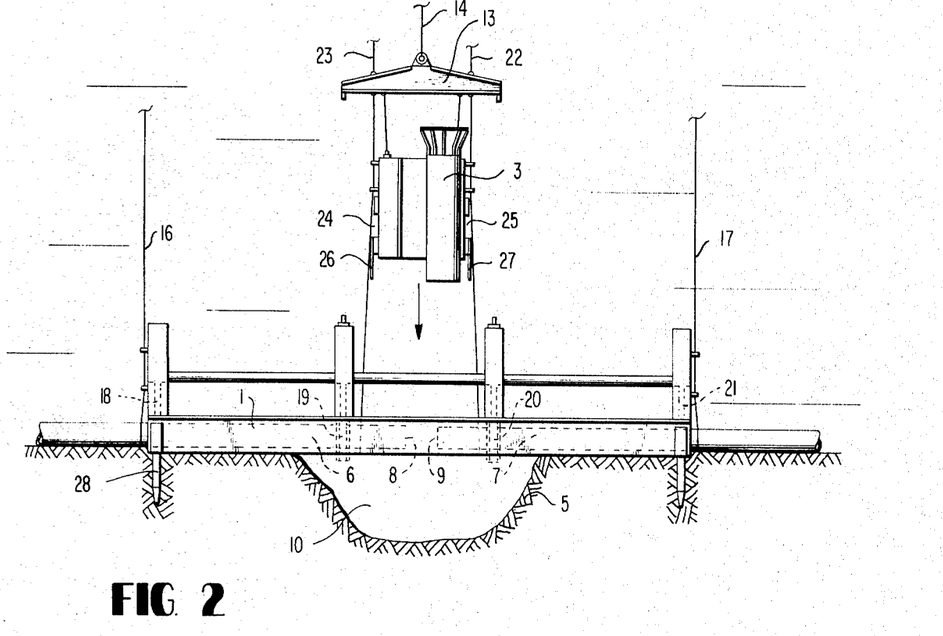
FIG. 2 illustrates the diving frame installed in claimping or superposed cooperation with pipeline sections, with a habitat or enclosure being lowered into installation position relative to the diving frame.

After the frame has been lowered into position in this manner, the hoisting bar means 13 may be disconnected from frame 1 and be employed to lower the habitat 3 into position over the ends 8 and 9 of the pipeline sections. During this operation, and as shown in FIG. 2, guidelines 22 and 23 may extend between the service boat 4, and the pipeline sections 6 and 7 and be employed to provide guided lowering of the habitat 3.

As is described in the aforesaid Banjavich et al. application, the habitat 3 will be lowered by hoisting and lowering gear 14 (extending from the service boat and connected possibly with the lowering bar 13) so that open aperture defining pipeline receiving ends 24 and 25 of the habitat will be lowered over the pipeline ends 8 and 9. Thereafter, seal defining door means 26 and 27, associated with the pipeline receiving cavities 24 and 25 will be closed so as to provide sealed end walls in the habitat encircling the pipeline ends.

The habitat 3 will provide a gaseous environment encircling the pipeline sections 8 and 9. Within this gaseous environment a connecting section (or valve or fitting) may be interposed between the section ends 8 and 9 and welded into place so as to effect the joining of the pipeline ends 8 and 9.

Before the joining operation is commenced, clamp control means may be operated either from the frame 1, or from the habitat 3, or from both the frame and habitat to effect appropriate aligning manipulation of the pipeline ends 8 and 9.

It is contemplated, for example, that this alignment could be effected with clamps 18 and 21 engaging the pipeline sections 6 and 7 so as to function as stationary fulcrums, with either or both of clamps 19 and 20 being shifted in position to effect the desired coaxial alignment of the pipeline sections 8 and 9. In certain instances it may be necessary to manipulate only one of the clamps 19 and 20 in this manner, while in other instances it may be desirable to effect such alignment manipulating movement of both of the clamps 19 and 20.

In other instances the fulcrum and alignment functions of the clamps may be reversed, that is to say, either of clamps 19 and 20 could function as fulcrum means, while either or both of the clamps 18 and 21 could function as alignment mechanisms so as to, in essence, adjust the orientation of the central longitudinal axis of the pipeline sections 6 and 7.

In still other instances each of the clamps on one or both sections may have to be manipulated to effect the desired axial orientation and positioning of the pipeline sections.

If desired, anchor or pile means 28 may be employed to more effectively anchor the frame 1 to the submerged surface 11 to facilitate and stabilize such pipeline section aligning operations. In many instances, however, the weight of the frame 1 will be sufficient in and of itself to enable these aligning functions to be implemented.

Figures 3, 4:
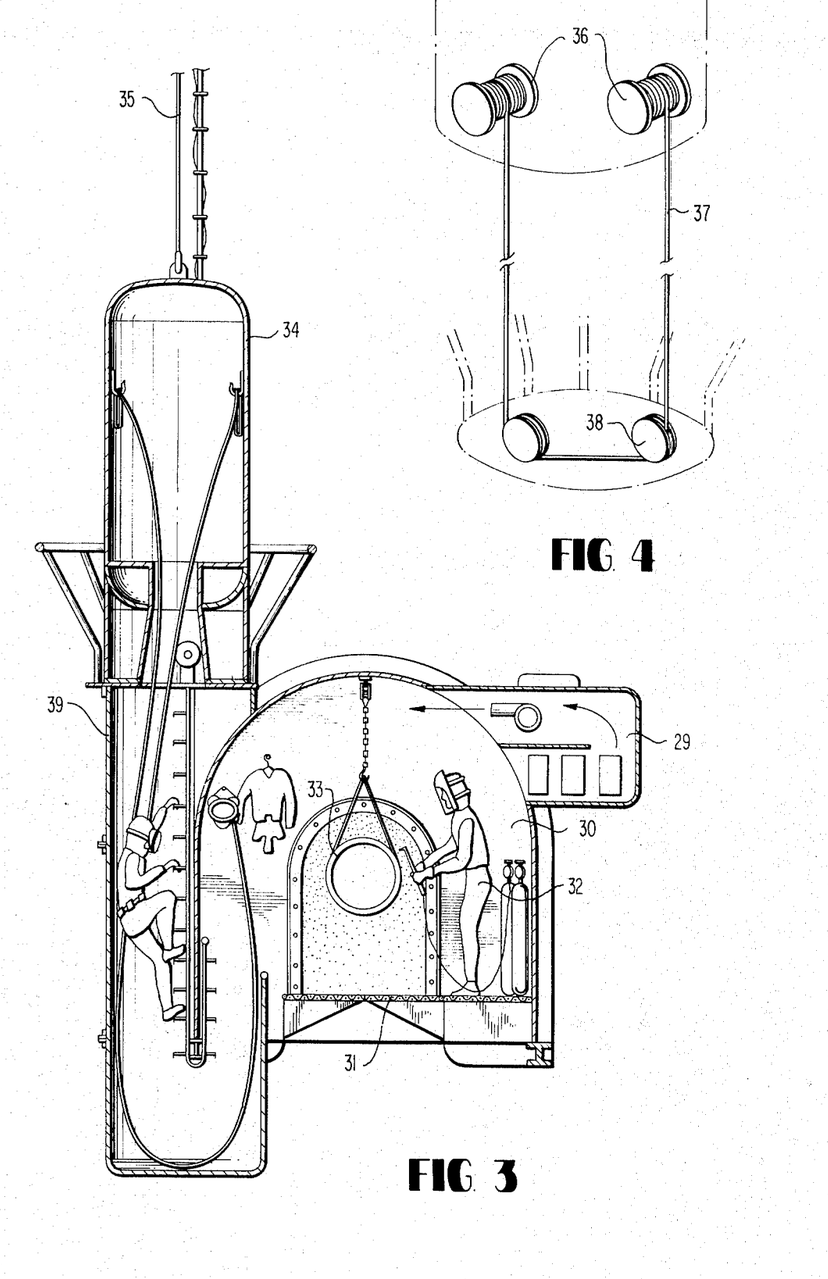
FIG. 3 provides a transverse, sectional and enlarged view of the habitat of FIG. 2, illustrating the habitat in installed cooperation with pipeline sections.
FIG. 4 provides a schematic rendering of a clamping of mechanism which may be employed to facilitate the transportion of a diving chamber between a surface boat and the installed habitat for the purpose of moving divers between the surface boat and the habitat, it being recognized that in many instances this mechanism and the diving chamber may not need to be employed in the practice of the invention.

As will be apparent by reference to FIG. 3, environment control means 29 may be associated with the habitat 3 and operable to regulate the humidity and/or temperature within the gaseous environment 30 of the habitat. This environment 30, as is described in the aforesaid Banjavich et al application, is disposed in pressure communicating relation with the water body surrounding the habitat. Such communication may be afforded by a perforate or gridlike floor 31 at the base of the habitat 3.

As FIG. 3 schematically illustrates, a diver 32 within the habitat interior 30 may effect welding repair and/or joinder operations. As further schematically shown in FIG. 3, the diver 32 is engaged in a welding operation, effecting the joinder of a chain hoist supported, short pipeline section 33 between the pipeline section ends 8 and 9.

In certain instances transportation of divers between the habitat 3 and the vessel 4 may be facilitated by diving chamber means 34. Diving chamber means 34 may be lowered and raised by hoisting means 35 extending between the chamber 34 and the work vessel 4, or some other work vessel.

As is described in the aforesaid Banjavich et al application, winch means 36 may drive a cable means 37 extending between sheave means 38 of the habitat 3 and the base of the diving chamber 34 for the purpose of drawing the chamber 34 into coupled relation with a diver transfer or entry chamber 39.

Various Clamp Embodiments

It is contemplated that each of the clamp means 18, 19, 20 and 21 may assume a variety of configurations. However, as to each such configuration, a capability should be present for exerting forces transversely of a pipeline section so as to effect either lateral or vertical alignment.

Figure 5:
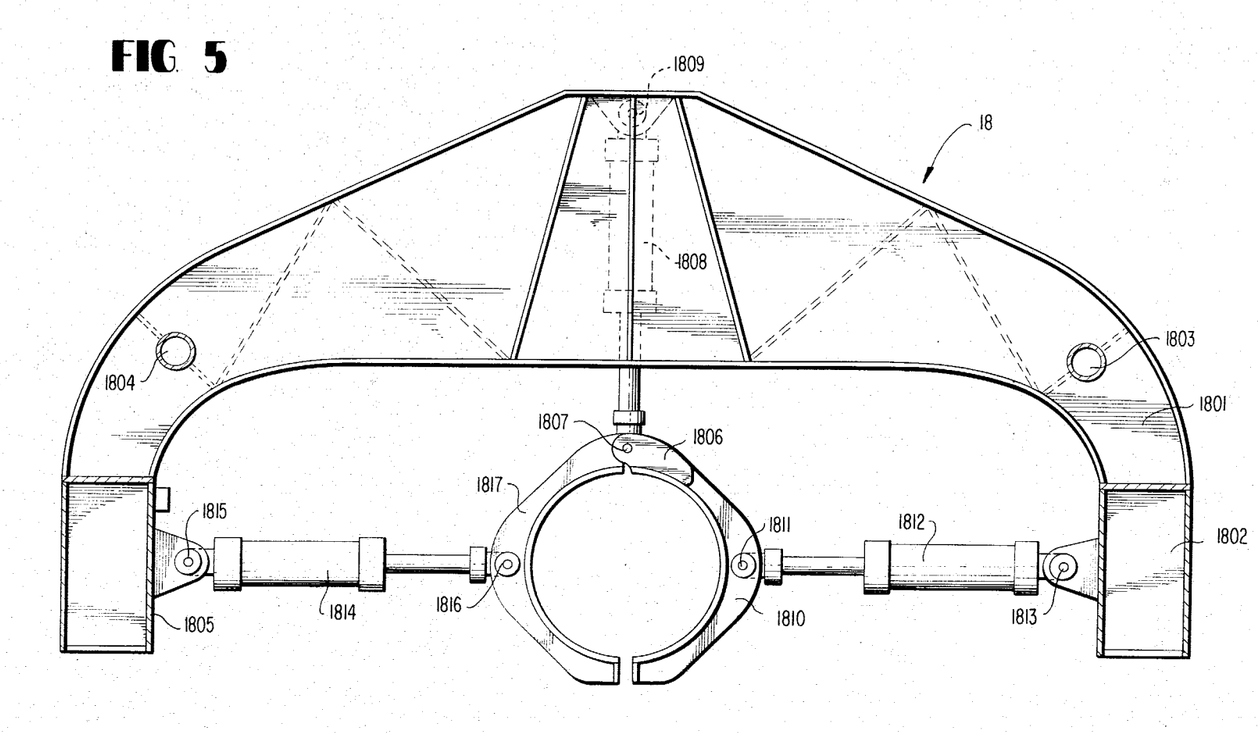
FIG. 5 provides a transverse sectional view of the FIG. 1 diving frame as viewed along section line 5—5, illustrating in end elevation one representative type of clamp arrangement which may be employed for pipeline gripping and/or aligning purposes.

Thus, in the arrangement described in the aforesaid Banjavich et al. application Ser. No. 841,777, a representative clamp 18, as shown in FIG. 5 of the present application, is supported by transverse frame means 1801. This frame means, as shown in FIG. 5, comprises a generally C-shaped, downwardly open, truss-like member. Longitudinally extending framing means 1802, 1803, 1804 and 1805, shown in FIG. 5, interconnect the various truss means which are associated with and individually support the various clamps 18, 19, 20 and 21.

As shown in FIG. 5, an articulated clamp 1806 is supported, through a pivot connection 1807, by a generally upwardly extending piston and cylinder assembly 1808. Piston and cylinder assembly 1808 is pivotally supported by pivot joint 1809 to an upper portion of the truss 1801. Pivot joints 1807 and 1809 have pivot axis extending longitudinally of frame 1.

One of two articulated clamp segments, i.e., segment 1810, is pivotally connected via pivot joint 1811 with a piston and cylinder assembly 1812. Piston and cylinder assembly 1812 in turn is pivotally connected by pivot joint 1813 to longitudinal framing member 1802.

Similarly, another piston and cylinder assembly 1814 is pivotally connected by pivot joints 1815 and 1816 to truss member 1805 and the other clamp segment 1817, respectively.

By manipulating the various piston and cylinder assemblies, under the control of a diver and either from the frame or from the interior of the habitat 3, the clamp segments 1810 and 1817 may be closed in circumscribing relation about a pipeline section. The three piston and cylinder assemblies may then be manipulated so as to exert selectively and transversely directed forces on the clamped pipeline section so as to provide either a fulcrum or alignment action. A representative manner in which either or both of these actions may be accomplished is described in detail in the aforesaid Banjavich et al. application Ser. No. 841,777, the disclosure of which is incorporated in its entirety by reference in this application.

Figure 6:
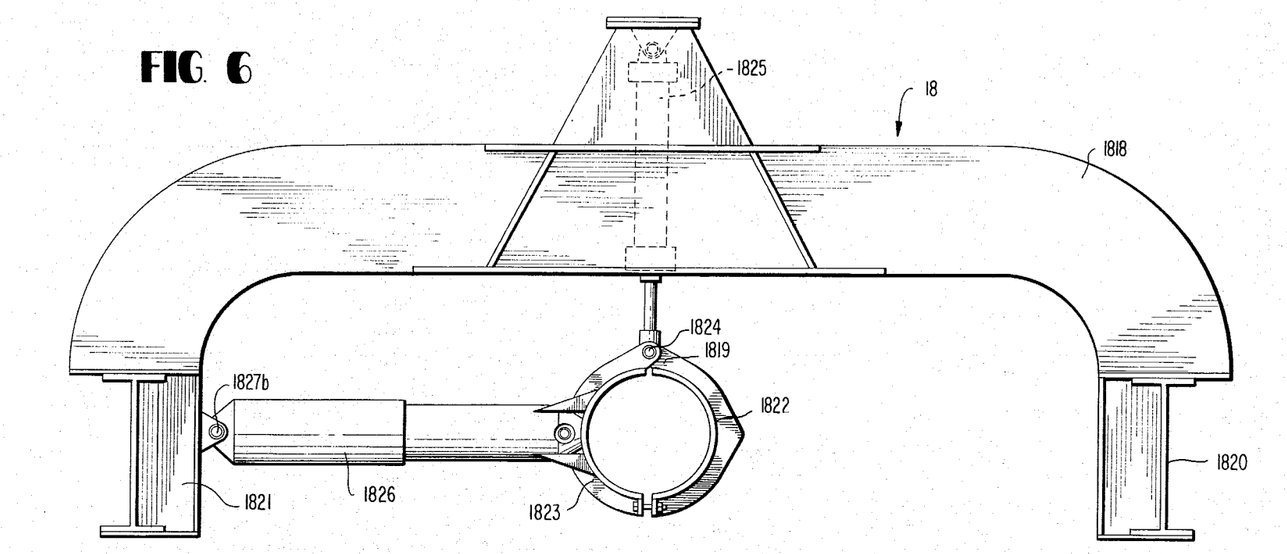
FIG. 6 provides an end elevational view, at the general location of section line 5—5 of FIG. 1, illustrating an alternative clamping and/or aligning arrangement.

A somewhat modified clamping and truss arrangement is shown in FIG. 6.

As shown in FIG. 6, a representative truss section 1818 supports an articulated clamp 1819. Various trusses of the type shown in FIG. 6 may be individually associated with each or all of the clamps 18, 19, 20 and 21 and may be interconnected by longitudinally extending framing means 1820 and 1821, etc.

Each articulated clamp 1819 may comprise clamp half segments 1822 and 1823 which are supported by a pivot joint 1824 on an upwardly extending piston and cylinder assembly 1825. Assembly 1825 corresponds in general to the previously noted piston and cylinder assembly 1808.

Figure 7:
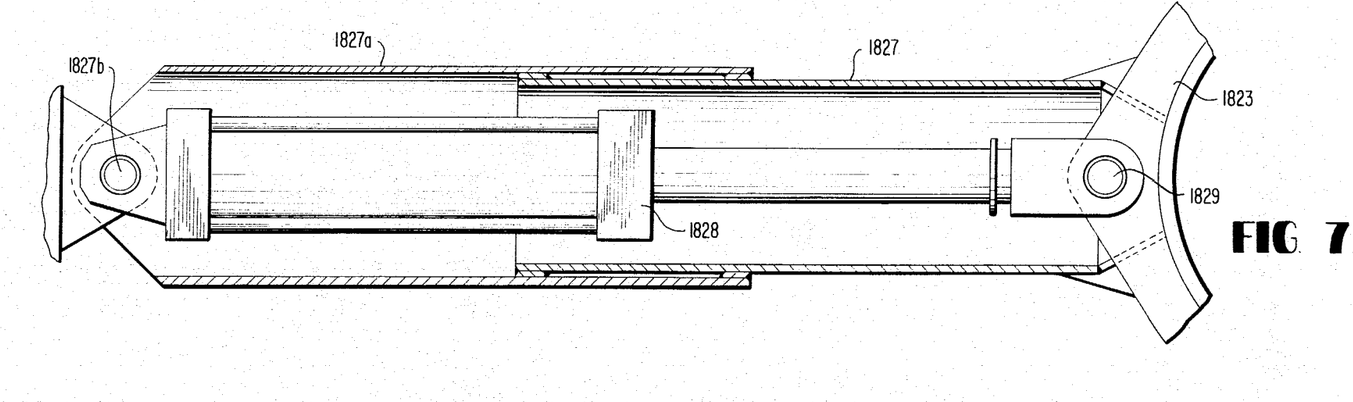
FIG. 7 provides an enlarged fragmentary and partially third of a reinforced or ruggedized piston and cylinder arrangement incorporated in the FIG. 6 embodiment.

A ruggedized piston and cylinder assembly 1826 interconnects framing member 1821 and one clamp segment 1823. As is shown in FIG. 7, this ruggedized assembly comprises an inner telescoping cylinder 1827 which is fixedly connected, as by welding, to clamp segment 1823. An outer telescoping cylinder member 1827a telescopingly receives member 1827 and is pivotally connected by pivot means 1827b to framing member 1821.

Within the telescopable assebmly of components 1827 and 1827a, an actuating piston and cylinder assembly 1828 is disposed. Piston and cylinder assembly 1828 is pivotally connected with pivot joint 1827b and may be connected at its opposite end by a pin joint 1829 with clamp 1823.

With this arrangement, flexing of the piston and cylinder assembly 1828 is impeded through the structural supporting action of the telescoping assembly of components 1827 and 1827a.

Significantly, with the arrangement shown in FIGS. 6 and 7, translation of the clamp 1819 in either lateral or vertical directions may be effected with only two piston and cylinder assemblies.

Figures 8, 9, 10:
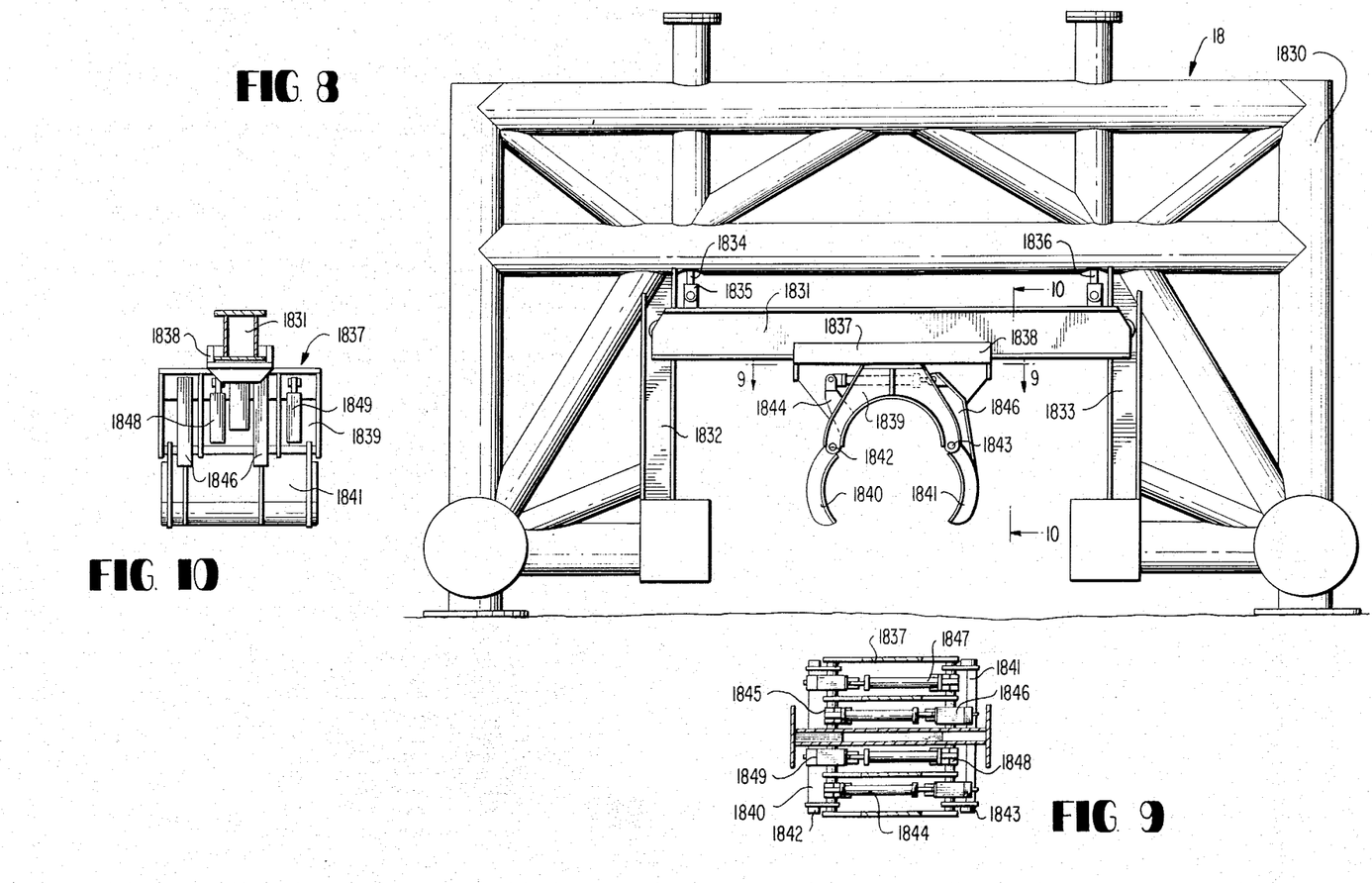
FIG. 8 provides an end elevational view of still another alternative clamping arrangement which could be employed for pipeline aligning and/or clamping purposes in lieu of either the FIG. 5 or FIG. 6 arrangements.
FIG. 9 provides a transverse sectional view of a clamping component of the FIG. 8 assembly, viewing this clamping component along section line 9—9 of FIG. 8.
FIG. 10 provides a transversely sectioned, end elevational view of the clamping component of FIG. 10 as viewed along section line 10—10 of FIG. 8.

A still further clamp arrangement which might be employed and, indeed, which has been effectively employed in the piston in practicing the invention, and which like the FIGS. 6 and 7 embodiment is embraced within the concepts exemplified by the FIG. 5 disclosure is featured in FIGS. 8–10.

As is shown, representative clamp 18 may comprise a tubular member defined, transverse truss 1830. Truss 1830 supports a beam 1831 which is mounted for vertical sliding movement on upright trackways 1832 and 1833. Beam 1831 is selectively manipulatable on trackways 1832 and 1833 through operation of elevating or hoisting means 1834. Hoisting means 1834 may comprise cable and/or piston and cylinder means 1835 and 1836 engaging, in a force balanced manner, opposite ends of the beam 1831. By selectively actuating hoisting means 1834, the elevation of beam 1831 may be selectively adjusted by operators or divers.

A clamp mechanism 1837 is slidably supported on beam 1831 for transverse sliding movement. This transverse sliding movement of clamp assembly 1837 along the beam 1831 may be conveniently effected by a variety of shifting means, including piston and cylinder means, not shown, which interconnect the beam 1831 with the clamp assembly base 1838. Base 1838 may be slidably supported on a track-like base beam 1831, as shown in FIG. 10.

As will be apparent by reference to FIGS. 8, 9 and 10, clamp assembly 1837 may comprise an upper, generally semi-cylindrical, clamp segment 1839. A pair of generally quarter cylinder, clamp segments 1840 and 1841 may be pivotally connected to lower edges of the clamp segment 1839 by pivot means 1842 and 1843. A pair of piston and cylinder assemblies 1844 and 1845 may be mounted on the left side of segment 1839, viewing the apparatus as shown in FIG. 8. These piston and cylinder assemblies may be connected on the right side of the segment 1839 via bracket members 1846 which in turn are connected with segment 1841.

With this arrangement, coordinated and selective actuation of the piston and cylinder assemblies 1844 and 1845 will serve to induce pivoting movement of clamp segment 1841.

Another pair of piston and cylinder assemblies 1847 and 1848 may be mounted on the right side of segment 1839 and be connected with bracket means 1849 extending upwardly from segment 1840. With this arrangement, selective and coordinated actuation of piston and cylinder means 1847 and 1848 will serve to induce selective opening and closing, i.e., pivoting movement of the clamp segment 1840.

Thus, in connection with the embodiment shown in FIGS. 8–10, the piston and cylinder assemblies carried by 1839 may be manipulated to effect circumscribing closure of the segments 1840 and 1840 about the underside of a pipeline section.

By shifting the clamp base 1838 along the rail 1831 and by effecting selective adjustments in elevation of the beam 1831, the lateral and/or vertical positioning of the clamp may be selectively adjusted and/or determined.

As will be appreciated, in all of the embodiments previously described, the pivot joints all have mutually parallel pivot axes extending longitudinally of the frame 1.

In certain instances, the massive nature of the diving frame 1 may dictate the advisability of providing a segmented or modular frame arrangement.

In this connection, it is contemplated that the clamps 18 and 19 could be supported on a frame which is structurally independent of another frame supporting the clamps 20 and 21.

With this sort of a divided frame arrangement, each frame half could be selectively manipulated into pipeline section clamping position.

It it contemplated that with such an arrangement the weight of each frame half may provide sufficient frame stability or that additional stability might be employed by means such as frame half securing pile means or structural means installed by divers and interconnecting the installed frame halves.

Modifications in the clamp and frame of the type heretofore described are here discussed solely for the purpose of indicating various ways in which the basic generic aspects of the invention may be practiced. Claims limited to specific structural aspects of these modifications are not here presented, it being recognized that such modifications may not now be independently patentable in light of applicant's prior uses of the invention and not necessary in light of generic aspects of the invention embraced by the disclosure of the aforesaid Banjavich et al. application Ser. No. 841,777.

Self-Propelled Enclosure — Frame Combination

It is contemplated that, in certain instances, the habitat 3 may be integrated with the frame 1 such that the frame 1 and habitat 3 would be lowered into operative position as a unitary assembly.

Indeed, an arrangement which, in essence, integrates the frame and habitat in the form of a self-propelled enclosure—frame combination may now be described.

Figure 11:
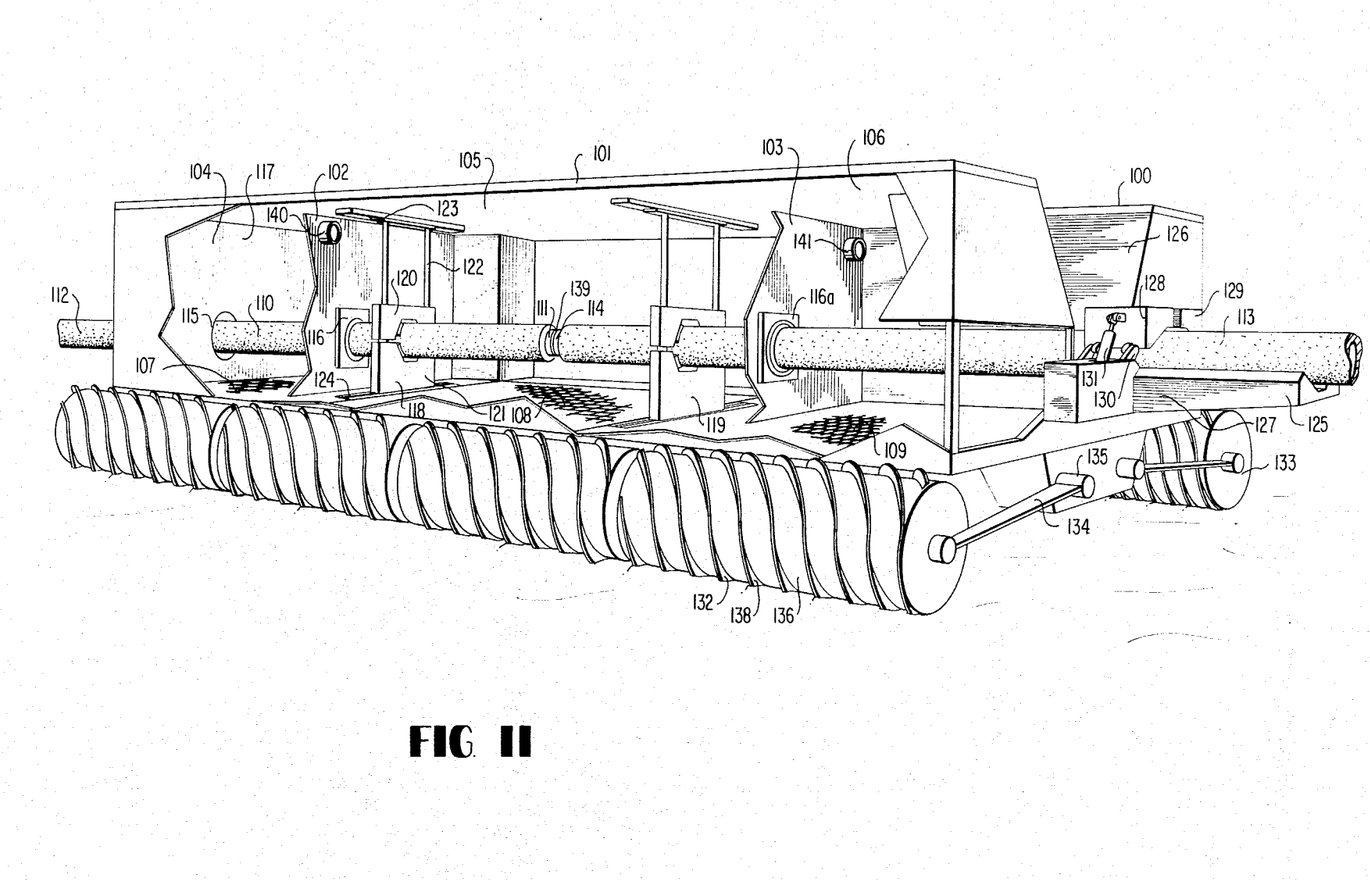
FIG. 11 provides a partially sectioned perspective view of a self-propelled underwater enclosure means which may be employed for pipeline laying and/or repairing and/or working operations.

FIG. 11 provides, in perspective and partially sectioned view, an illustration of such an integrated habitat—frame assembly 100.

Assembly 100 may be considered as comprising an enclosure means 101 which is divided by upright bulkheads 102 and 103 into a first chamber 104, a second chamber 105 and a third chamber 106.

As will be apparent by reference to FIG. 11, second chamber 105 is interposed longitudinally between the first and third chambers 104 and 106 with reference to the lingitudinal axis of a pipeline 112 being laid.

Each of the chambers 104, 105, and 106 is operable to contain a gaseous environment which is in direct communicating relation with a water body surrounding the assembly 100. This communication may be provided through perforate grid-like floor means 107, 108 and 109.

The floor means 107, 108 and 109 correspond in general to the grid-like base means 250 and 251 associated with the habitat featured in FIG. 5 of the aforesaid Banjavich et al. application Ser. No. 841,777.

The grid-like or perforate bases of the enclosure 101 may include various openings, movable sections, etc. operable to facilitate movements of divers between the interior of the enclosure compartments and the exterior of the apparatus 100.

Similarly, various lock or passage arrangements may be provided at the bulkheads 102 and 103 to facilitate movement of divers and operatives between the chambers. In addition, the enclosure may be provided with various lock or access passage arrangements to facilitate movements of divers between the interior of the enclosure 101 and its exterior. Such passage arrangements could, for example, be similar to the access or transfer passage means 233 featured in FIG. 5 of the aforesaid Banjavich et al. application.

As shown in FIG. 11, a first pipeline section 110 extends through the first chamber 104, into the second chamber 105, so as to dispose a free section end 111 within the interior of the second or central chamber 105.

A new pipeline section, i.e., a second section 113, is supported by the apparatus so as to extend from the third chamber 106, into the second chamber 105. The second pipeline section is thus supported so that its free end 114, which is to be connected with the end 111 of joint 110, is disposed within the second chamber 105 in the general proximity of pipeline section end 111.

Supporting of the pipeline in this manner may be provided by bulkhead passage means 115, 116 and 116a carried by enclosure end wall 117 and bulkheads 102 and 103, respectively. Other pipeline support means may be provided in the chambers 104, 105 and 106, corresponding possibly to the roller-type support means associated with the barge ramp featured in Lawrence U.S. Pat. No. 3,390,532. The use of such auxiliary pipeline support rollers being conventional and well understood, these roller arrangements have not been illustrated in FIG. 11.

Supports 116 and 116a may comprise selectively releasable seal means corresponding in general to the type of seal means featured in FIGS. 15 and 16 of the aforesaid Banjavich et al. application Ser. No. 841,777 and comprising seal segments 208 and 213. These seal segments may be mounted for relative movement away from and toward the axis of their respectively associated pipeline sections for seal opening and closing purposes.

With the seals closed, and with chamber 105 dry or occupied by gas at least to a level as low as the seals 116 and 116a, the gaseous environment within the chamber 105 will be retained.

With the seals 116 and 116a opened, the apparatus 100 will be freed relative to the pipeline 112 and able to be advanced along the pipeline to a new assembly or joint forming site.

As will be understood, cradle, roller or bearing arrangements may be associated with each of the means 115, 116 and 116a to provide pipeline support in these areas and facilitate pipeline movement during vessel propelling operations.

With this seal arrangement, each of the seal means 116 and 116a is operable to telescopingly receive its respectively associated pipeline section 110 or 113.

A pair of pipeline aligning clamp means 118 and 119 are disposed within the interior of chamber 105.

Each of these aligning clamp means is operable to engage and selectively manipulate one pipeline section.

Thus, as shown in FIG. 11, clamp 118 is disposed in clampable cooperation with pipeline section 110 while clamp means 119 is disposed in clampable cooperation with section 113.

Each of the aligning clamps 118 and 119 is mounted for both generally horizontal and vertical shifting movement.

Thus, as is shown in connection with representative clamp means 118, the clamp means may comprise vertically separable clamp segments 120 and 121 which are mounted for selective vertical adjustment on vertically extending frame or track means 122. Frame or track means 122 is in turn mounted for selective horizontal adjustment transversely of the longitudinal pipeline axis on trackways 123 and 124.

This track arrangement thus closely parallels the aligning adjustment arrangement described in connection with FIG. 8.

Conventional movement facilitating devices may be employed to effect convergence and separation of the clamp segments 120 and 121 as well as horizontal and vertical movements of the clamp segments when they are closed about a pipeline section.

With a pipeline section engaged by a seal, and engaged as well by a clamp, the seal will function as a fulcrum while manipulation of the clamp disposed in gripping cooperation with the pipeline section will selectively adjust the positioning and alignment of the pipeline section end.

By thus manipulating either or both of the clamp means 118 and 119, the pipeline section ends 111 and 114 may be brought into the desired coaxial alignment for pipeline end joining operations.

It is contemplated that a variety of techniques may be employed to effect the joinder of the pipeline ends 111 and 114, including welding operations.

For the purpose of feeding the new pipeline section 113 into the interior of the enclosure a feeding means 125 may be employed.

As is shown generally in FIG. 11, feeding means 125 may comprise a downwardly diverging hopper-like trough 126 which is operable to receive the pipeline section 113 as it is lowered from a service vessel. Trough 126 will guide the section 113 into supported cooperation with support and feed means 127.

The support and feed means may comprise a longitudinally extending support 127 containing a series of longitudinally spaced drive wheels or rollers or one or more caterpillar track means or other drive means operable to engage the underside of the pipeline section 113. Transversely movable, and mirror-image related clamp means 128 and 129 may be employed for the purpose of engaging the top of the pipeline section 113 so that the section will be held in driving cooperation with the support and drive means 127. As is schematically shown in FIG. 11, each such segment may be pivotally connected to support and drive means 127 by pivot means 130 and transversely manipulated about the pivot means by hydraulic piston and cylinder means 131.

As will be apparent, a variety of other feeding and clamping arrange-ments could be employed.

For example, the clamp means could comprise a single means operable to pivot about an axis extending horizontally and transversely of the pipeline axis so as to pivot through the opening defined by trough 126. Drive means could be contained within the movable clamp means instead of, or in addition to, drive means provided by the underlying support means 127.

By way of example, drive and support means associated with either or both of the means 127 and 128 may correspond in general to the tensioning wheel or track concept envisioned in connection with the disclosure of Lawrence U.S. Pat. Nos. 3,487,648 and 3,390,532.

The assembly 100 is also provided with self-propelling means. Such self-propelling means may comprise a series of articulated, helical screw-type, drive means 132 and 133 mounted on each longitudinally extending lower side of the apparatus 100.

Each such drive means 132 and 133 may comprise a plurality of independent sections supported for independent upward pivotal movement by support bracket means 134. Each such support bracket means would provide a pivot joint 135 permitting vertical pivotal movement of a segment 136 (or the entire drive means 132 or 133) relative to enclosure 101.

A resilient biasing or other suspension arrangement could be employed to maintain the drive means in driving cooperation with the submerged surface 111 upon which the pipeline apparatus 100 is laying, while permitting the aforesaid articulation of the drive means. With each of the drive means 132 and 133 segmented, the drive means may articulate and more readily conform to irregularities in the submerged surface 111 so as to promote more efficient propelling action.

By rotating each of the segments 136, either independently or in a coordinated fashion, the helical drive screw means 138 of the segments will effect movement of the mechanism 100 along the submerged surface.

The environment within the enclosure 101 may be controlled, as described in the aforesaid Banjavich et al. application Ser. No. 841,777, so as to provide humidity and temperature control conducive to effective welding operations and properly support life within the habitat.

During normal welding operations where section ends 111 and 114 are being joined, it is contemplated that a gaseous environment would be provided within central chamber 105 extending below the joint 139 between the pipe section ends 111 and 114 and below the seal means 116 and 116a.

During such welding operations, the compartments or chambers 104 and 105 would be wholly or partially flooded. Valve and gas pump means 140 and 141 may be provided in association with the bulkheads 102 and 103 to selectively control the transfer of gas between the central chamber 105 and the end chambers 104 and 106.

It is contemplated that mechanisms 140 and 141 would be operated to transfer gas from chamber 105 into chambers 104 and 106 in order to flood the enclosure chamber 105 at least to a level above the seals 116 and 117 when the mechanism 100 was to be advanced to a new pipeline joint forming location.

Various arrangements may be employed for supplying the gaseous environment in apparatus 100 and supplying power for operating the pipeline section feeding means and the enclosure propelling means.

In connection with the power source, power could be self-contained and comprise, for example, battery means, fuel cell means, etc. Alternatively, power could be supplied by umbilical means extending between the apparatus 100 and a surface-located service vessel.

With respect to the gaseous environment, the enclosure 101 could be provided with gas tanks providing a substantial "on-site" supply. Umbilical means could also extend between the chamber 105 (or other portion of the enclosure 101) and such a service vessel for the purpose of either supplying or replenishing the gaseous environment.

Bearing the foregoing discussion in mind, several variations in concepts emerge.

The clamps 118 and 119 could advantageously comprise downwardly opening articulated assemblies much like the articulated clamp structures of FIGS. 5 through 10. With such articulated clamp structures, and with an opening in the base of enclosure 101 extending its longitudinal length beneath the pipeline sections, and with an openable arrangement for seals 116 and 116a corresponding to the habitat door seal arrangement above noted and described in detail in the aforesaid Banjavich et al application, the apparatus 100 may be lifted vertically away from, or lowered vertically over, a pipeline in much the same way that habitat and frame of the Banjavich et al. application are manipulated. By making the apparatus 101 selectively variable in buoyancy, it could be made operable to be "blown" to the water surface.

While the vehicle propulsion system could comprise auger means, as illustrated, other means such as tracks, wheels, jets, drive means engaging the pipeline, or tow means extending to a "mother ship" or service boat could be employed. Various adjusting means could be provided to selectively adjust the elevation and orientation of drive means such as augers, tracks, or wheels relative to the enclosure body.

The energy used by the apparatus 100 could be self contained, supplied through umbilical means extending from a service boat, and could be generated either on the apparatus 100 of a service boat and stored in accumulator means on the apparatus 100.

Underwater Pipeline Laying Method

With the basic elements of the apparatus having been described, it is appropriate at this juncture to consider various representative manipulative steps which may be involved in a pipeline joining operation.

FIGS. 12A–12F schematically illustrate the disposition of components of the apparatus 100 during various stages of its operation.

Figure 12A:
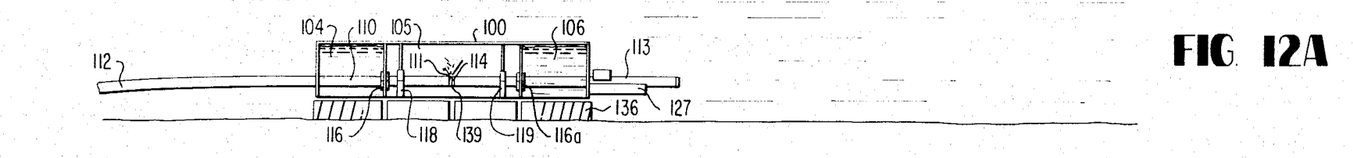
FIG. 12A illustrates the disposition of the apparatus during a welding or pipeline section joinder operation where a central chamber defines a generally gaseous environment.

As shown in FIG. 12A, central chamber 105 is occupied by gas and end chambers 104 and 106 are substantially flooded. Seals 116 and 116a are closed and clamps 118 and 119 have been manipulated so as to effect the proper alignment of the pipe section ends 111 and 114. With the apparatus thus disposed, joint 139 may be formed, for example, by welding.

Figure 12B:
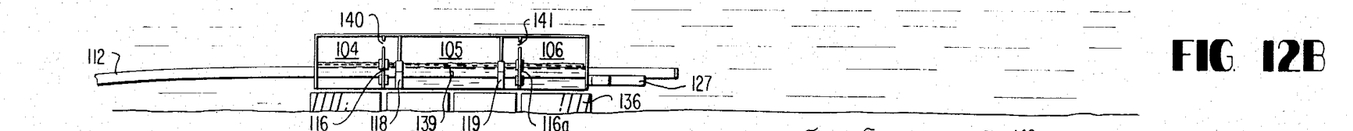
FIG. 12B illustrates the manner in which the central compartment of the FIG. 11 apparatus may be flooded to facilitate the subsequent advancing of the FIG. 11 apparatus to a new joint location.

As shown in FIG. 12B, after joint 139 has been formed, means 140 and 141 may be operated to transfer gas from chamber 105 to chambers 104 and 106 so as to flood the seals 116 and 116a. With the flooded seals 116 and 116a and the clamps 118 and 119 released from clamping engagement with the pipeline sections, the apparatus 100 is free to be propelled to the right, away from the previously laid pipeline area 112.

Figure 12C:
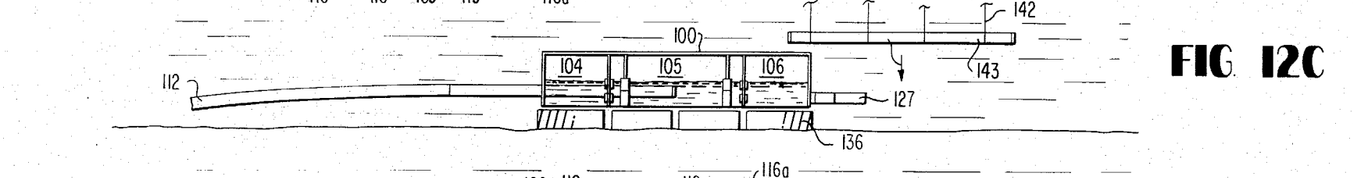
FIG. 12C schematically illustrates the new location of the FIG. 11 enclosure, with a new pipeline section being lowered into position for joinder purposes, FIG. 12D schematically illustrates the advancing of the new pipeline section into the FIG. 11 enclosure so that the free end of the section will be disposed within the central chamber.

FIG. 12C illustrates the apparatus 100 after it has been moved by propelling means 132 and 133 to a new pipeline joint forming location. At this location, a new joint 143 is being lowered by hoisting means 142 from a service vessel into the guide trough 126.

Figure 12D:
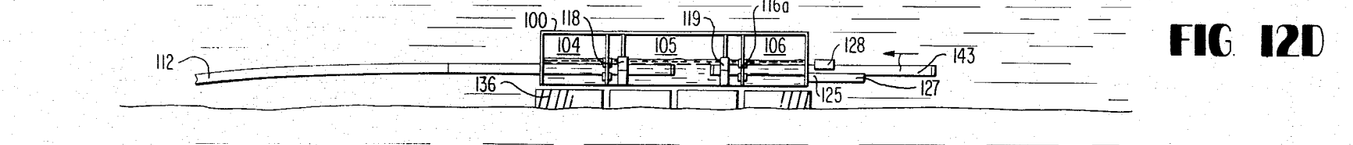

FIG. 12D illustrates the new joint 143 after it has been guided by the trough 126 into support means 127. As shown in FIG. 12D, the clamp means 128 and 129 have been closed over the top of the new section 143 and the feeding mechanism 125 has operated to commence the feeding of the new joint 143 through the open seal means 116a and open clamp means 119 into the interior of central chamber 105.

Figure 12E:
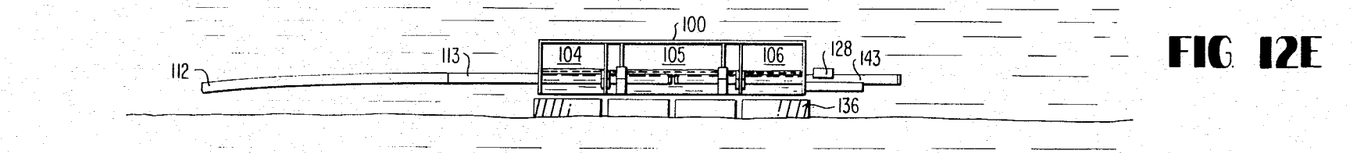
FIG. 12E illustrates the new pipeline section disposed in position with its free end projecting into the central chamber of the FIG. 11 apparatus.

After the new pipe section 143 has been fed to the joinder position, shown in FIG. 12E, the seals 116 and 116a may be closed and the clamps 118 and 119 also closed about the pipeline sections 113 and 143.

Figure 12F:
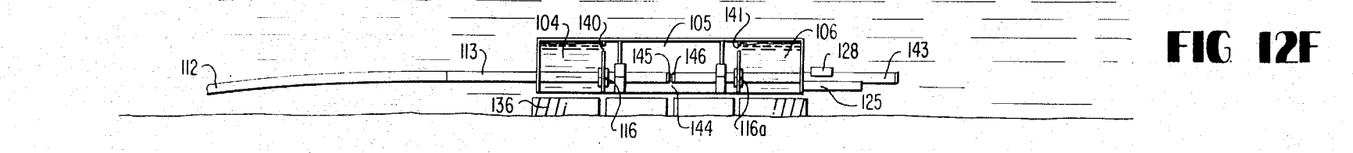
FIG. 12F illustrates the manner in which the central compartment of the FIG. 11 enclosure has been purged of sufficient water to provide a gaseous environment encircling the free ends of the pipeline sections to be joined.

As shown in FIG. 12F, the environment control means 140 and 141 may now be operated to retransfer gas from the upper gas type portions of chambers 104 and 106 intcentral chamber 105 so as to again define a relatively dry gaseous environment encircling the seals 116 and 116a and the joint zone 144 between the contiguous ends of the sections 113 and 143.

Before a welding or joining operation is effected, the clamp means 118 and 119 may be selectively manipulated so as to properly align the ends 145 and 146 of the sections 113 and 143 in preparation for welding or joining operations.

In conjunction with this aligning operation, the feeding means 125 may be operated, if desired, to selectively adjust the axial positioning of the new joint 143. Such adjustments in axial positioning of the new joint 143, of course, may require partial or full opening of the seal 116a and/or clamp 119 for the relatively brief period of time during which an axial adjustment is being made.

In order to prevent the loss of the gaseous environment within the enclosure 101, through either of the pipeline sections being joined, it may be desirable to employ pipeline plug means.

Such plug means may comprise plugs which are frictionally engageable with the interior of a pipeline and operable to withstand the pressure of the gaseous environment within chamber 105 without being caused to move relative to the pipeline interior. However, this frictional interaction would not be sufficient to withstand fluid pressure generated within the installed pipeline to displace the plugs therefrom after the pipeline laying operation was completed.

While frictional plugs of this nature conceivably could be employed, other releasable pipeline plugs are contemplated in connection with this type of a control operation, including selectively releasable plugs of the type featured in the aforesaid Coultrup U.S. Pat. No. 3,407,611.

By way of example, it is contemplated that each new pipeline section such as the section 113 would be lowered into place with a pipeline end sealing plug disposed within the interior of each end. At the commencement of the pipeline forming operation the free submerged end of the pipeline 112, such as the end 111, would also contain such a sealing plug.

All of the plugs could be left in place during the operations described in connection with FIGS. 12A through 12F and removed after the pipeline laying operation was completed.

Alternatively, and particularly if pipeline section 112 was closed at its starting end and filled with gas, it might be feasible in certain instances to remove the plugs from the facing ends of the sections to be joined, with this removal being effected within the chamber 105. The removed plugs could be moved from time to time out of the chamber 105, through an opening in its base, and transported to the surface to a service vessel for use in connection with the sealing of additional pipeline sections to be lowered to the apparatus 100.

Conventional line-up clamp means, pipeline end machining means, and manual and/or automatic welding means may be incorporated within the chamber 105 for the purpose of implementing the joinder of pipeline section ends.

Where other pipeline section joinder techniques are employed, apparatus necessary to effet such joining will be included within the chamber 105 for manipulation by divers or operatives.

SUMMARY OF OVERALL ADVANTAGES AND GENERAL SCOPE OF INVENTION

The utilization of fulcrum defining and alignment inducing forces in conjunction with a diving frame, in the unique manner heretofore described, provides optimum control and flexibility in relation to underwater pipeline repairing, laying, or working operations. With the concept composite changes in orientation and positioning of pipeline section axes and ends may be effected.

This concept contributes significantly to a reduction in the time necessary to complete underwater operations and often makes possible the performing of underwater work which could not otherwise be expeditiously effected.

The self-propelled arrangement for laying a pipeline uniquely incorporates the advantages of habitat-type joining, repairing and/or working operations with self-propulsion and pipeline section feeding so as to permit pipeline operations to be conducted without reliance on surface vessels. Particularly where deep water operations are involved, this technique would avoid the substantial problems contemplated in connection with the water surface-originated laying techniques, i.e., in connection with the use of a conventional lay barge.

The unitized frame and habitat system contemplated in connection with the submerged pipelaying vessel yields the foregoing advantages and enables the relatively expensive gaseous environment to be effectively conserved so as to reduce the cost of underwater operations and significantly extend the time during which a vessel with a self-contained gas source would be able to operate.

Further, this concept, as employed with "open bottom" chambers provides an effective, easy to utilize vehicle which is characterized by ease of access and reliability in environment control.

Those familiar with this disclosure and skilled in the pipelaying art may recognize additions, deletions, substitutions and other modifications in addition to those herein suggested, all of which would be deemed to fall within the scope of the invention as set forth in the appended claims.

What is claimed is:

1. A method of working on conduits in a submerged location, said method comprising:
    manipulating frame means relative to an underwater pipeline so as to selectively locate said frame means relative to said pipeline;
    from said frame means, independently exerting a series of longitudinally spaced, independent, and transversely directed forces on at least two disconnected sections of said pipeline to adjust the alignment thereof;
    on at least one of said two sections of said pipeline,
        exerting at least one restraining force on one portion of said one pipeline section to provide fulcrum means reacting transversely on said one pipeline section, and
        exerting at least one other aligning force on another portion of said one pipeline section, said aligning force being exerted on said other portion of said one pipeline section to tend to move said other portion of said one pipeline section generally transversely of the one portion of said one pipeline section against which said fulcrum means is reacting;

isolating disconnected ends of said first and second pipeline sections in a gaseous environment which is contained relative to said frame means; and within said gaseous environment, effecting a joinder of said disconnected ends of said pipeline sections.

2. A method to facilitate working on submerged conduit means, said method comprising:

providing frame means operable to be lowered from floating vessel means;

effecting selective manipulation of said frame means so as to selectively position said frame means relative to at least one of said first and second sections of said pipeline;

providing a first plurality of independently operable clamp means carried by at least one portion of said frame means, and spaced longitudinally of a first section of a submerged pipeline and clampingly engaged therewith;

providing a second plurality of independently operable clamp means carried by at least another portion of said frame means, and spaced longitudinally of a second section of said submerged pipeline, and clampingly engaged therewith, with said second pipeline section being disconnected from said first pipeline section;

defining a gaseous environment enclosing disconnected ends of said first and second sections of said pipeline;

causing each clamp of said first plurality of clamp means to independently and selectively exert independent force on said first section of said submerged pipeline directed generally transversely of said first section;

causing each clamp of said second plurality of clamp means to independently and selectively exert independent force on said second section of said submerged pipeline directed generally transversely of said second section.

3. A method of laying a pipeline on a submerged location, said method comprising:

enclosing disconnected ends of pipeline sections in working chamber means of enclosure means, with said working chamber means providing a gaseous environment at an underwater location;

forming a joint interconnecting said disconnected pipeline sections in said gaseous environment;

displacing gas from said gaseous environment and, in said working chamber means, immersing said joint interconnecting said pipeline sections in water;

transporting said working chamber means containing said gaseous environment away from said immersed joint toward an extremity of one of said pipeline sections to be joined to another pipeline section;

while said enclosure means is being transported away from said immersed joint, storing said gas displaced from said gaseous environment in other chamber means included in said enclosure means and transporting said thus stored gas and other chamber means with said wroking chamber means toward said extremity of said one of said pipeline sections;

transferring said stored gas from said other chamber means back into said working chamber means so as to displace water therefrom and reestablish a gaseous environment; and forming another joint connecting said one of said pipeline sections and said other pipeline section in said reestablished gaseous environment within said enclosure means.

4. A method for effecting the underwater laying of a pipeline, said metod comprising:

providing submerged enclosure means including,
a first chamber means,
a second chamber means, and
a third chamber means,
said second chamber means being interposed longitudinally between said first and third chamber means, relative to a longitudinal axis of said enclosure means;

supporting a first pipeline section extending through said first chamber means into said second chamber means;

supporting a second pipeline section extending from said thrid chamber means into said second chamber means;

providing first seal means between said first and second chamber means operable to telescopingly receive said first pipeline section;

providing second seal means between said second and third chamber means operable to telescopingly receive said second pipeline section;

operating first aligning clamp means in said second chamber means to engage and selectively manipulate said first pipeline section;

operating second aligning clamp means in said second chamber means to engage and selectively manipulate said second pipeline section;

controlling the environment in said enclosure means by selectively displacing water from said second chamber means to define a gaseous environment encircling disconnected ends of said first and second pipeline sections contained within said second chamber means, and transferring gas from said second chamber means to said first and third chamber means to submerge said first and second seal means.

5. A method for effecting the underwater laying of a pipeline, said method comprising:

providing submerged enclosure means including,
a first chamber means,
a second chamber means, and
a third chamber means,
said second chamber means being interposed longitudinally between said first and third chamber means relative to a longitudinal axis of said enclosure means;

supporting a first pipeline section extending through said first chamber means into said second chamber means;

supporting a second pipeline section extending from said third chamber means into said second chamber means;

providing first seal means between said first and second chamber means operable to telescopingly receive said first pipeline section;

providing second seal means between said second and third chamber means operable to telescopingly receive said second pipeline section;

operating first aligning clamp means in said second chamber means to engage and selectively manipulate said first pipeline section;

operating second aligning clamp means in said second chamber means to engage and selectively manipulate said second pipeline section;

feeding means carried by said third chamber means and operable to selectively advance said second pipeline section from said third chamber means toward and into said second chamber means;

propulsion means carried by said enclosure means and operable to advance said enclosure means from said first pipeline section toward said second pipeline section;

controlling the environment in said enclosure means by
  selectively displacing water from said second chamber means to define a gaseous environment encircling disconnected ends of said first and second pipeline sections contained within said second chamber means, and
  transferring gas from said second chamber means to said first and third chamber means to submerge said first and second seal means when said propulsion means is to be operated to advance said enclosure means from said first pipeline section toward said second pipeline section.

6. Apparatus for working on conduits in a submerged location, said apparatus comprising:

frame means;

manipulating means operable to manipulate said frame means relative to an underwater pipeline so as to selectively locate said frame means relative to said pipeline;

aligning means operable from said frame means to independently exert a series of longitudinally spaced, independent, and transversely directed forces on at least two disconnected sections of said pipeline to adjust the alignment thereof;

said aligning means being operable relative to at least one of said two sections of said pipeline,
  to exert at least one restraining force on one portion of said one pipeline section to provide fulcrum means reacting transversely on said one pipeline section, and
  exert at least one other aligning force on another portion of said one pipeline section, with said aligning force being exerted on said other portion of said one pipeline section to tend to move said other portion of said one pipeline section generally transversely of the one portion of said one pipeline section against which said fulcrum means is reacting;

enclosure means operable to isolate disconnected ends of said first and second pipeline section in a gaseous environment which is contained relative to said frame means while effecting a joinder of said disconnected ends of said pipeline sections.

7. An apparatus to facilitate working on submerged conduit means, said apparatus comprising:

frame means operable to be lowered from floating vessel means;

a first plurality of independently operable clamp means
  carried by at least one portion of said frame means, and
  operable to be spaced longitudinally of a first section of a submerged pipeline and clampingly engageable therewith;

a second plurality of independently operable clamp means
  carried by at least another portion of said frame means, and
  operable to be spaced longitudinally of a second section of said submerged pipeline and clampingly engageable therewith, with said second pipeline section being disconnected from said first pipeline section;

first clamp actuating means connected with said first plurality of clamp means and operable to cause each clamp of said first plurality of clamp means to independently and selectively exert independent force on said first section of said submerged pipeline directed generally transversely of said first section;

second clamp actuating means connected with said second plurality of clamp means and operable to cause each clamp of said second plurality of clamp means to independently and selectively exert independent force on said second section of said submerged pipeline directed generally transversely of said second section;

means associated with said frame means and operable to define a gaseous environment enclosing disconnected ends of said first and second sections of said pipeline; and means operable to effect selective manipulation of said frame means so as to selectively position said frame means relative to at least one of said first and second sections of said pipeline.

8. Apparatus for laying a pipeline on a submerged location, said apparatus comprising:

enclosure means operable to enclose disconnected ends of pipeline sections in a gaseous environment at an underwater location while forming a joint interconnecting said disconnected pipeline sections;

means for displacing gas from said gaseous environment and immersing said joint interconnecting said pipeline sections in water;

means for transporting said enclosure means operable to define said gaseous environment away from said immersed joint toward an extremity of one of said pipeline sections to be joined to another pipeline section; and means for displacing water from said enclosure means in order to form another joint connecting said one of said pipeline sections and said other pipeline section in a gaseous environment within said enclosure means.

9. An apparatus for effecting the underwater laying of a pipeline, said apparatus comprising:

enclosure means including,
  a first chamber means,
  a second chamber means, and
  a third chamber means,
  said second chamber means being interposed longitudinally between said first and third chamber means relative to a longitudinal axis of said enclosure means;

means operable to support a first pipeline section extending through said first chamber means into said second chamber means;

means operable to support a second pipeline section extending from said third chamber means into said second chamber means;

first seal means between said first and second chamber means operable to telescopingly receive said first pipeline section;

second seal means between said second and third chamber means operable to telescopingly receive said second pipeline section;

first aligning clamp means carried in said second chamber means and operable to engage and selectively manipulate said first pipeline section;

second aligning clamp means carried in said second chamber means operable to engage and selectively manipulate said second pipeline section;

environment control means carried by said enclosure means and operable to selectively displace water from said second chamber means to define a gaseous environment encircling disconnected ends of said first and second pipeline sections contained within said second chamber means, and transfer gas from said second chamber means to said first and third chamber means and submerge said first and second seal means.

10. An apparatus for effecting the underwater laying of a pipeline, said apparatus comprising:

enclosure means including,
a first chamber means,
a second chamber means, and
a third chamber means,
said second chamber means being interposed longitudinally between said first and third chamber means relative to a longitudinal axis of said enclosure means;

means operable to support a first pipeline section extending through said first chamber means into said second chamber means;

means operable to support a second pipeline section extending from said third chamber means into said second chamber means;

first seal means between said first and second chamber means operable to telescopingly receive said first pipeline section;

second seal means between said second and third chamber means operable to telescopingly receive said second pipeline section;

first aligning clamp means carried in said second chamber means and operable to engage and selectively manipulate said first pipeline section;

second aligning clamp means carried in said second chamber means and operable to engage and selectively manipulate said second pipeline section;

feeding means carried by said third chamber means and operable to selectively advance said second pipeline section from said third chamber means toward and into said second chamber means;

propulsion means carried by said enclosure means and operable to advance said enclosure means from said first pipeline section toward said second pipeline section;

environment control means carried by said enclosure means and operable to selectively displace water from said second chamber means to define a gaseous environment encircling disconnected ends of said first and second pipeline sections contained within said second chamber means, and transfer gas from said second chamber means to said first and third chamber means and submerge said first and second seal means.

11. Apparatus for laying a pipeline on a submerged location, said apparatus comprising:

enclosure means operable to enclose disconnected ends of pipeline sections in a gaseous environment at an underwater location while forming a joint interconnecting said disconnected pipeline sections;

passage means carried by said enclosure means and operable to afford fluid communication between said gaseous environment and a water body surrounding said enclosure means;

means for transporting said enclosure means which is operable to define said gaseous environment away from a said joint toward an extremity of one of said pipeline sections which is to be joined to another pipeline section;

aligning means within said enclosure means operable to effect alignment of ends of pipeline sections to be formed; and feeding means associated with said enclosure means and operable to feed one pipeline section toward another pipeline section having an end disposed in said gaseous environment and dispose an end of said one section within said gaseous environment.

12. A method of laying a pipeline on a submerged location, said method comprising:

at a submerged location, providing an enclosure means which is operable to define a gaseous environment;

providing fluid communication between said gaseous environment of a water body surrounding said enclosure means;

within said enclosure means, feeding one pipeline section toward another pipeline section and aligning ends of said pipeline section which are to be joined within said gaseous environment;

forming a joint interconnecting said ends of said pipeline sections in said gaseous environment; and transporting said enclosure means operable to define said gaseous environment away from said joint toward an extremity of one of said pipeline sections which is to be joined to another pipeline section.

* * * * *